Jan. 3, 1950     S. M. LILLIS     2,493,255
FLUID SEAL

Filed Nov. 8, 1943     2 Sheets-Sheet 1

INVENTOR.
Stephen M. Lillis,
BY
Parkinson + Lane
Attys

Witness:
Chas. L. Kourek

Jan. 3, 1950 S. M. LILLIS 2,493,255
FLUID SEAL
Filed Nov. 8, 1943 2 Sheets-Sheet 2
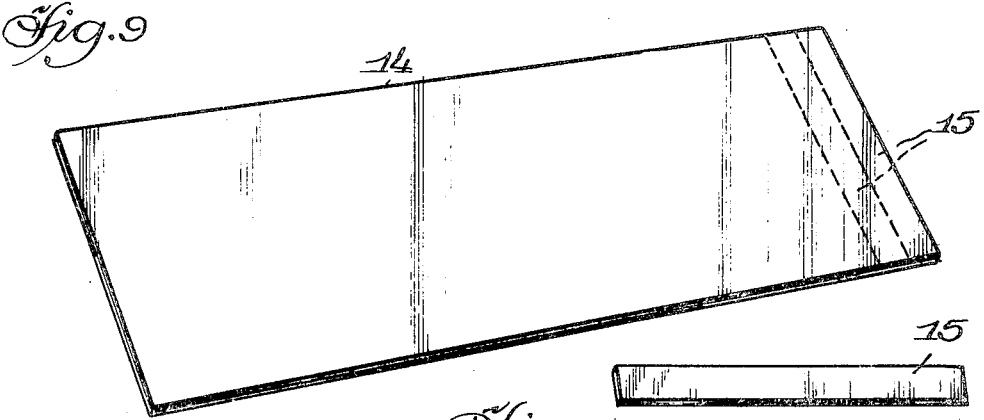
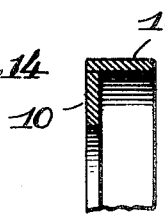
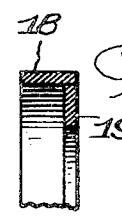
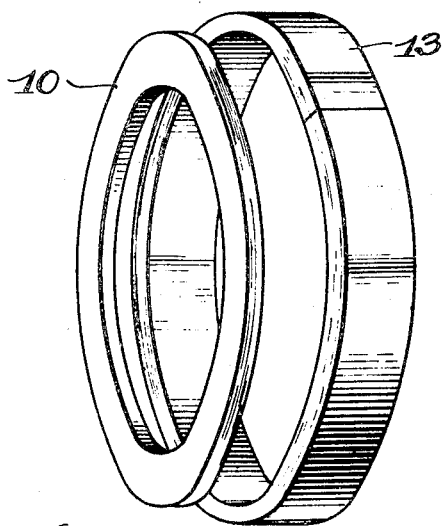
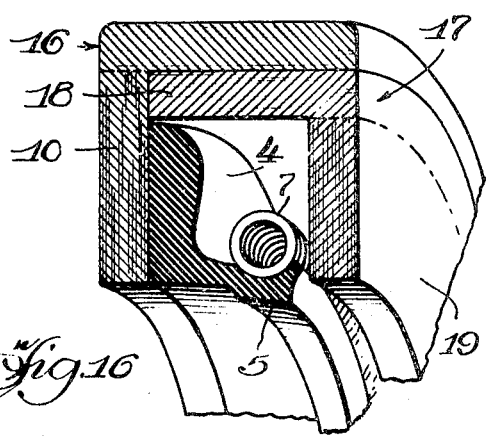
Witness:
Chas. X. Housh
INVENTOR.
Stephen M. Lillis,
BY
Parkinson & Lane
Attys Patented Jan. 3, 1950

2,493,255

UNITED STATES PATENT OFFICE 2,493,255

FLUID SEAL

Stephen M. Lillis, Chicago, Ill., assignor to Victor Manufacturing & Gasket Company, Chicago, Ill., a corporation of Illinois Application November 8, 1943, Serial No. 509,374

4 Claims. (Cl. 288—3)

The present invention relates to a fluid or oil seal and especially to a novel means and method of forming sealing mechanism for sealing the space between relatively rotatable or concentric members such as a rotatable shaft and its surrounding housing.

Although in the illustrative embodiment the seal is shown as of the internal type in which the body or retaining shell is mounted within the surrounding housing and its sealing lip is maintained in sealing and wiping contact with a rotatable shaft, the novel seal is equally well adapted for use as an external type in which the body or retaining shell is secured upon and rotates with the shaft and the sealing lip is maintained in wiping and sealing contact with the interior surface of the surrounding housing.

Among the objects of the present invention is to provide a non-metallic fluid or oil seal in which the body or retaining shell is formed of a phenolic-resin impregnated fibre board and the sealing diaphragm of a compounded synthetic rubber, the channel section carrying the sealing diaphragm and this diaphragm being simultaneously molded together as an integral unit.

A further object of the novel invention is the method of forming the channel section of a laminated resin-impregnated fibre board. In the preferred embodiment the resin-impregnated fibre board is wound or rolled in spiral formation upon a mandrel until the desired thickness is secured for forming the cylindrical wall, and the bottom section or end wall is formed of a blank or washer of laminated molding stock, the blank or washer and the curved cylindrical wall being preformed in the cold form. This preformed channel is then placed in a mold with a blank of compounded synthetic rubber stock for forming the resilient sealing diaphragm and the channel and diaphragm molded into an integral, finished member in a single operation.

In the preferred form of the invention the inner channel, except for the omission of a sealing diaphragm, is formed in the same manner as the outer channel and of a phenolic-resin fibre board, the cylindrical or curved wall and the bottom section or blank being preformed and joined in a cold mold by being placed in a die and closed, after which they are molded together in a single operation.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 9 is a view in perspective of a sheet of laminated resin-impregnated fibre board of predetermined thickness from which strips are cut for forming the cylindrical or curved walls of an alternate construction of channel members.

Figure 10 is a view in perspective of one of the laminated strips.

Figure 11 is an enlarged fragmentary view in end elevation of a strip and showing its laminated structure.

Figure 12 is a view in perspective of an end wall or bottom section of one of the channels.

Figure 13 is an enlarged view of the cylindrical wall and end wall of the top channel in disassembled relation and prior to the preforming operation.

Figure 14 is a fragmentary view in vertical cross section through the preformed top channel.

Figure 15 is a view similar to Figure 14, but of the bottom channel.

Figure 16 is an enlarged sectional view in perspective of the final assembled alternate construction of oil seal.

Figure 1:
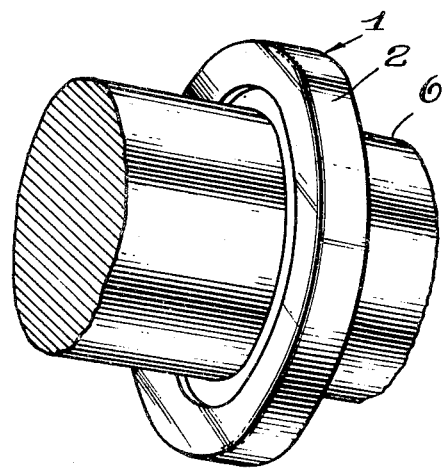
Figure 1 is a view in perspective of the novel non-metallic fluid seal formed as an internal type seal surrounding a rotatable shaft for sealing the space between the shaft and a surrounding or encompassing housing in which the seal is mounted by a press-fit.
Figure 2:
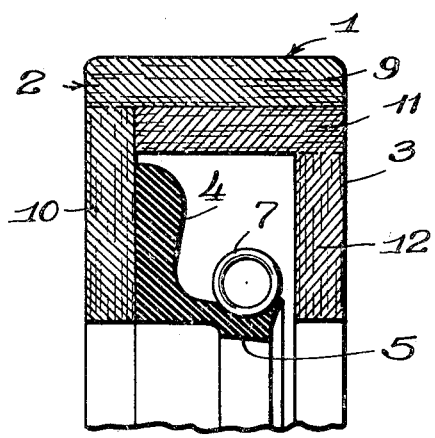
Figure 2 is an enlarged view in vertical cross section through the complete seal.

Referring more particularly to the illustrative embodiment disclosed in Figures 1 to 8 of the drawings, the novel oil seal 1 comprises an outer channel 2, an inner channel 3, a sealing diaphragm 4 having a lip 5 for wiping and sealing contact with a rotatable shaft 6, and a coil spring 7 for maintaining the sealing lip in sealing contact with the shaft. The channel members 2 and 3 are preferably formed of a resin-impregnated fibre board or paper.

Figure 3:
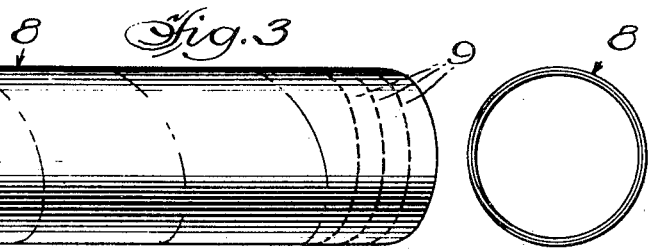
Figure 3 is a perspective view of a length of resin-impregnated fibre board and showing the manner of forming the cylindrical or curved channel wall.
Figure 5:
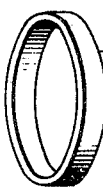
Figure 5 is a view in perspective of the cylindrical channel wall as cut or severed from the spirally wound length shown in Figure 3.
Figure 4:
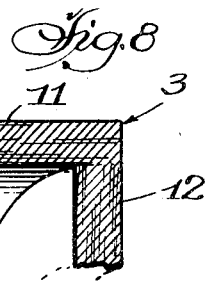
Figure 4 is an end view of the channel wall and showing the spiral winding of the board.

Figure 3 shows a length of the resin-impregnated fibre board 8 rolled in spiral formation upon a suitable mandrel until the desired thickness of board is obtained. It is then cut or severed into cylindrical strips 9 of the desired width for forming the cylindrical wall of a channel as shown in Figure 5, the strips being preferably cut so that the grain of the fibre board or paper is in the direction of the short dimension.

Figure 6:
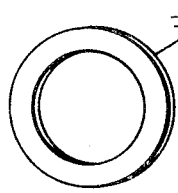
Figure 6 is a view in perspective of an end wall or bottom section of a channel also formed of laminated resin-impregnated fibre board.

Figure 6 shows the end wall 10 formed of laminations of resin-impregnated fibre board which is blanked from a sheet of this molding stock. The cylindrical wall 9 and end wall 10 are then placed in a preform die and the die closed. After preforming this channel cold, it is placed in a mold with a blank of compounded synthetic rubber stock for forming a sealing diaphragm 4, and the channel and compounded synthetic rubber stock are then molded for a predetermined period and at a predetermined temperature. Excellent results having been secured by employing a phenolic-resin impregnated fibre board and by molding the preformed channel and sealing diaphragm stock for 30 minutes and at a temperature of approximately 312° F. This cure sets up both the phenolic-fibre channel and the compounded synthetic rubber diaphragm in a single operation to form a finished outer channel 2.

Similarly, the cylindrical wall 11 is preferably formed from a spirally wound sheet of phenolic-resin impregnated fibre board rolled to the proper thickness of laminations upon a mandrel of the desired diameter, and strips of the desired width are then cut therefrom in a manner similar to that shown in Figure 3. The end wall 12 is blanked from a flat sheet of this material, after which the cylindrical wall 11 and end wall 12 are placed in a preforming die and the die-closed to unite these members. This preform channel is then placed in a mold and molded for the desired period of time and at the desired temperature. The result is a finished channel 3 which is adapted to be inserted into the channel 2 and bonded thereto by suitable adhesive or the like.

Figures 7, 8:
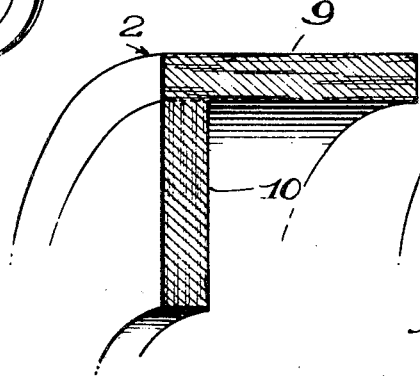
Figure 7 is a fragmentary enlarged view in perspective of the preformed outer channel.
Figure 8 is a fragmentary enlarged view in perspective of the preformed inner channel member.

Figures 9 to 16, inclusive, disclose an alternate construction in which the cylindrical wall 13 is cut from a flat sheet of desired thicknesses built up of laminations of resin-impregnated fibre board 14, the strips 15 cut therefrom being curved into a circular or cylindrical form by rolling on a mandrel of the desired diameter. An end wall or washer 10, similar to that shown in Figures 6 and 7, is then assembled with the cylindrical wall 13 as shown in Figures 13 and 14, with the ends of the wall 13 in abutting relation as shown in Figure 12. The blank or end wall 10 and the curved or cylindrical strip 13 are then placed in a preform die and the die closed.

After the cold preforming operation, the resulting channel is then placed in a mold with a blank of compounded synthetic rubber stock for forming the sealing diaphragm 4 and the composite structure is molded for the desired period of time and at the desired temperature. As stated above, excellent results have been secured by molding these members for a period of 30 minutes and at a temperature of approximately 312° F. This results in the integral outer channel 16 shown in Figure 16. Similarly the inner channel 17 is formed of a strip 18 of laminated phenolic-resin fibre board curved into a cylindrical form upon a mandrel and with its ends or edges in abutting relation in the manner shown in Figure 13. The end wall or washer 19 is then placed within the cylindrical wall 18 as shown in Figure 15, and these members are placed in a preforming die. After cold forming, in this manner this preform channel is then placed in a mold and molded in the same manner as the outer channel.

If desired, the sheet 14 for making the outer and inner channels 13 and 18 may be formed on a mandrel with the adjoining edges or ends in abutting or contacting relation and preliminarily retained by an adhesive. The wall 13 or 18, depending on the diameter of the resulting tube, may then be severed of the desired width and the end wall 10 or 19 applied thereto, after which the assembly is preformed in the manner explained above.

By bonding the concentric cylindrical surfaces of the inner and outer channels together by an adhesive, the rigidity of the outer channel is enhanced and the end wall 12 or 19 of the inner channel is so located and retained as to prevent dislocation of the spring 7.

Having thus disclosed the invention, I claim:

1. A seal for closing the space between a movable shaft and a stationary housing comprising a shaft encircling housing of channel section composed of two members of L-section and having cylindrical portions telescoped together, each of said members being composed of laminations of fibrous material bonded together by a phenolic resin, said housing including parallel annular portions projecting radially inwardly from opposite ends of said telescoped portions; a sealing element of rubberlike material disposed in the channel in said housing and comprising an annular base bonded to the inside face of the annular portion of one of said housing members and a shaft engaging portion projecting from said base toward the annular portion of the other housing members; and a tension member encircling the extending portion of said sealing element and tensioned to hold that portion in seal-forming engagement with a shaft.

2. A seal for closing the space between a movable shaft and a stationary housing comprising a shaft encircling housing of channel section composed of two members of L-section telescoped together, each of said members being composed of laminations of fibrous material bonded together by a phenolic resin, said housing including parallel annular portions projecting radially inwardly from opposite ends of said telescoped portions; a sealing element of rubberlike material disposed in the channel in said housing and bonded to the inner face of one of said annular portions and extending toward the other annular portion; and a tension member encircling said extending portion and tensioned to hold that portion in seal-forming engagement with a shaft.

3. A seal for closing the space between a moving shaft and a stationary housing comprising a cup-like housing comprising a cylindrical section and an annular section extending radially inwardly from one end of the cylindrical section, said housing being composed of laminations of fibrous material bonded together with a phenolic resin, a sealing member comprising a frusto-conical shaft engaging member and an integral annular base member, both composed of a rubberlike compound, which base member is bonded to the annular section of said housing, a garter spring encircling the frusto-conical portion of said sealing member and tensioned to keep said portion in seal-forming engagement with said shaft; and an inner cup-like member composed of laminations of fibrous material bonded together with a phenolic resin and consisting of a cylindrical section telescoped in the cylindrical portion of the housing and a flat annular portion projecting radially inwardly from one end of said inner cylindrical section and disposed with its outer face in the plane of the cylindrical end of said outer housing, said inner member being cemented to the outer housing and extending radially inwardly beyond said garter spring to retain the garter spring in place on the sealing member.

4. A seal for closing the space between a moving shaft and a stationary housing comprising a cup-like outer member having a cylindrical portion and an annular portion projecting radially inwardly from one end of the cylindrical portion, said member being composed of laminations of fibrous material bonded together by a phenolic resin; a cup-like inner member having a cylindrical portion telescoped in the cylindrical portion of the outer member and an annular portion projecting radially inwardly from one end of the cylindrical portion, said inner member being composed of laminations of fibrous material bonded together by a phenolic resin and being secured to the outer member by cement engaging the cylindrical portions of the members, and being positioned with respect to the outer member so that the annular portion and cylinder end of the inner member lie in the plane end of the cylinder portion of the outer member, which plane is parallel to the outer face of the annular portion of the outer member; a sealing member composed of a rubber-like material having a base bonded to the annular portion of said outer member and a shaft engaging portion projecting radially inwardly from said base and toward the annular portion of said inner member, and a garter spring encircling the shaft engaging portion of said sealing member and tensioned to keep the same in seal-forming engagement with a shaft.

STEPHEN M. LILLIS.

REFERENCES CITED

The following references are of record in the file of this patent:

UNITED STATES PATENTS

| Number | Name | Date |
| --- | --- | --- |
| 1,466,086 | Christensen | Aug. 28, 1923 |
| 1,473,842 | Frederick | Nov. 13, 1923 |
| 2,013,865 | Sloan | Sept. 10, 1935 |
| 2,114,908 | Peterson | Apr. 19, 1938 |
| 2,201,576 | Dempsey | May 21, 1940 |
| 2,264,062 | Wilder | Nov. 25, 1941 |
| 2,289,608 | Victor | July 14, 1942 |
| 2,334,349 | Mika | Nov. 16, 1943 |

FOREIGN PATENTS

| Number | Country | Date |
| --- | --- | --- |
| 544,904 | Great Britain | of 1942 |